June 4, 1935.  L. H. HANSEL  2,003,934
GREASE RETAINING WASHER FOR BEARINGS
Filed Jan. 30, 1933
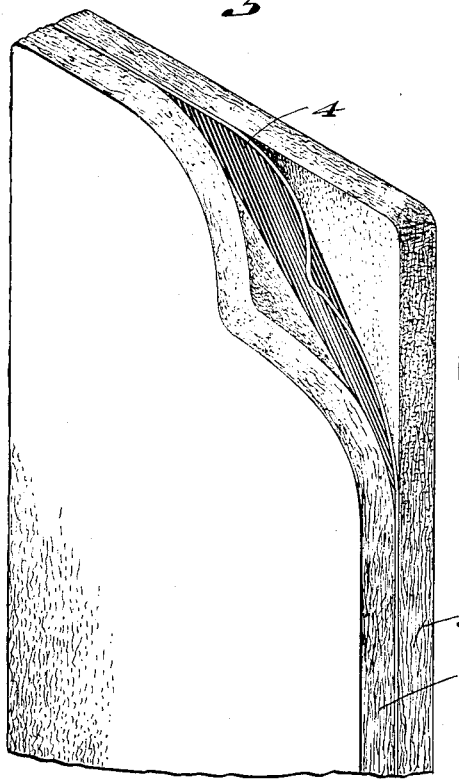
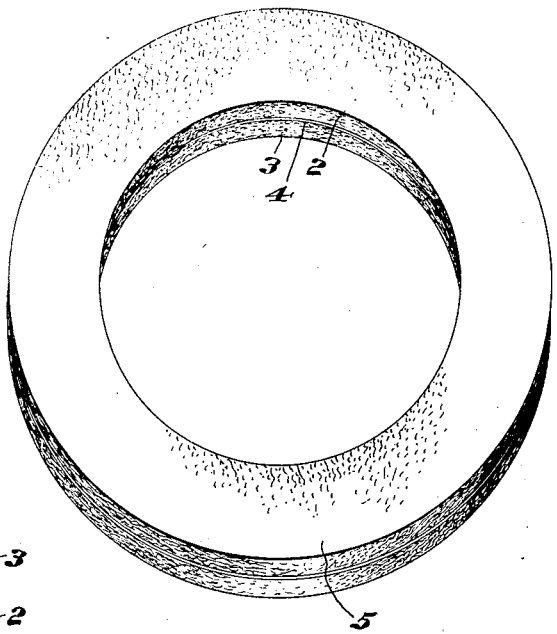
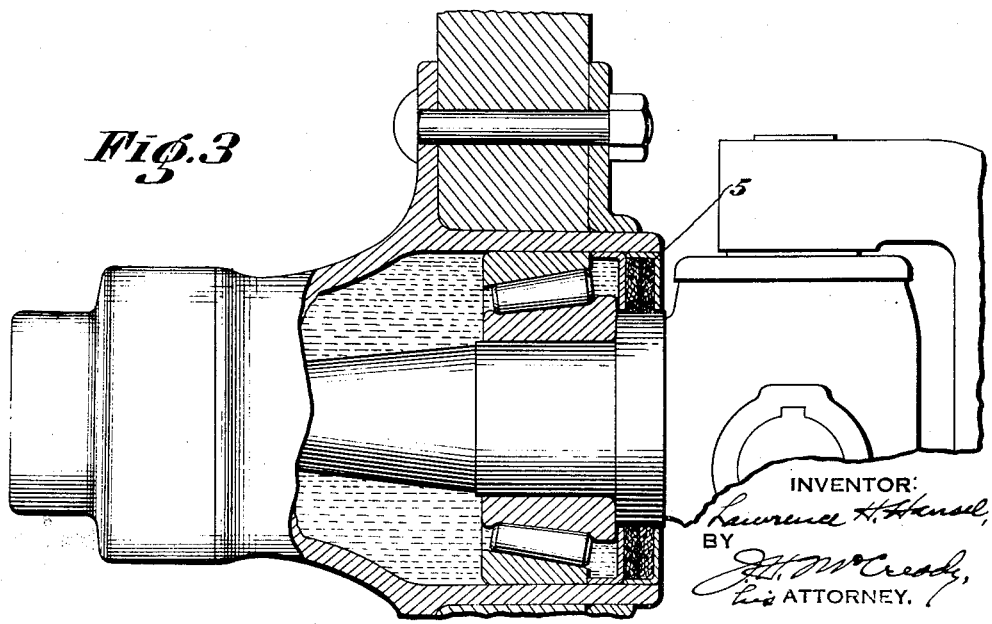
INVENTOR:
Laurence H. Hansel,
BY
J. H. McCready,
his ATTORNEY.

Patented June 4, 1935

2,003,934

UNITED STATES PATENT OFFICE 2,003,934

GREASE RETAINING WASHER FOR BEARINGS

Lawrence H. Hansel, Brookline, Mass., assignor to The Felters Company, Boston, Mass., a corporation of Massachusetts Application January 30, 1933, Serial No. 654,179

2 Claims. (Cl. 154—2)

This invention relates to oil retaining washers for bearings and to sheet materials from which to make such washers.

Such washers usually are made of leather or felt and they are intended to perform two functions,—one, to keep the external dirt and grit out of the bearing, and the other to prevent any substantial escape of lubricant from the bearing.

It has been recognized heretofore that an oil retaining washer should be impervious to oils and equivalent lubricants, but so far as I have been able to learn this object has never been realized. Metals obviously are not suitable for these purposes and rubber cannot be used because it is readily attacked by lubricating greases and oils and is converted into a gummy sticky mass having exceedingly disagreeable characteristics for use around any running part of a machine.

To devise a product which will satisfy these requirements constitutes the chief object of this invention.

The nature of the invention will be readily understood from the following description when read in connection with the accompanying drawing, and the novel features will be particularly pointed out in the appended claims.

In the drawing,

Figure 1 is a perspective view of a small portion of sheet material constructed in accordance with this invention;

Fig. 2 is a perspective view of an oil or grease retaining washer embodying features of the invention; and Fig. 3 is a view, partly in section and partly in side elevation, showing a bearing in which a washer like that illustrated in Fig. 2 is used.

Referring first to Fig. 1, the sheet material there shown comprises layers 2 and 3 of some fibrous oil absorbing material such, for example, as leather, felt or the like. Preferably a good quality of felt is used for this purpose. Between these layers is an intermediate flexible sheet 4 of material which is impervious to the passage of oil, grease or similar lubricants and is substantially unaffected by them. Preferably this intermediate sheet is made of chloroprene. This material can be purchased in the open market and is sometimes called synthetic rubber. In fact, it is a synthetic rubber of the polymerized acetylene type and is known chemically by the foregoing name or as polychloroprene. I have found that this material is not substantially affected by lubricants. It is practically water and oil proof, using these terms in their common or popular sense, it has the desired flexibility and can be readily combined with or bonded to fibrous sheet materials such as leather, felt, and others. The bonding operation can be performed by base coating one of the surfaces of each of the two pieces of felt with cements made of synthetic rubber dissolved in solvents such as benzol, carbon tetrachloride, and others, then calendering a thin ply of the same compound on this base and then combining the two sheets together in face to face contact. For some purposes a satisfactory product can be made simply by coating the two felt plies heavily with a cement such as that above mentioned and then pressing these plies together with their cement coated surfaces in face to face contact. After combining, the material is heated to 260° F. for two and a half hours to completely polymerize the chloroprene, making it resistant to oil.

From a composite sheet material so made washers like that shown at 5 in Figs. 2 and 3 and a variety of other parts can be cut out. An oil retaining washer made of this material is particularly effective because of the fact that it is relatively impervious to the passage of oil and grease. Such a washer, therefore, has an inner fibrous layer which serves to hold a substantial body of lubricant in contact with the bearing, as frequently as desirable, acting somewhat in the nature of a wick; it also includes an outer fibrous layer which is highly effective in excluding dust and grit, and the two layers are separated by an impervious sheet 4 which, as above stated, prevents any substantial penetration of the lubricant from one layer to the other. It also has the long bearing on the shaft or other running part which is desirable. Such a washer may be shaped to fit almost an endless variety of bearings and it may be used either in a sheet metal holder, as in the bearing shown in Fig. 3, or suited to various other features of design peculiar to individual bearings. For some purposes one layer of fibrous stock may be omitted, while in other cases one fibrous layer will differ in nature, properties and characteristics from that used at the opposite side of the intermediate impervious sheet.

Having thus described my invention, what I desire to claim as new is:

1. A grease retaining washer comprising an inner layer of felt adapted to hold a substantial body of lubricant, an outer layer of felt for excluding dust and grit, and a film of synthetic rubber of heat polymerized chloroprene, bonding said layers together but serving to prevent any substantial transfer of oil from one of said layers to the other.

2. The method of making grease retaining washers which comprises combining and bonding two layers of felt by heavily base coating a surface of at least one of the layers with a cement made of chloroprene, placing the two sheets together in face to face contact with the chloroprene coat therebetween, pressing the layers together, heating the laminated sheet thus formed for a sufficient period of time and at a suitable temperature to polymerize the chloroprene and render the same relatively impervious to oil.

LAWRENCE H. HANSEL.